Figure 1:
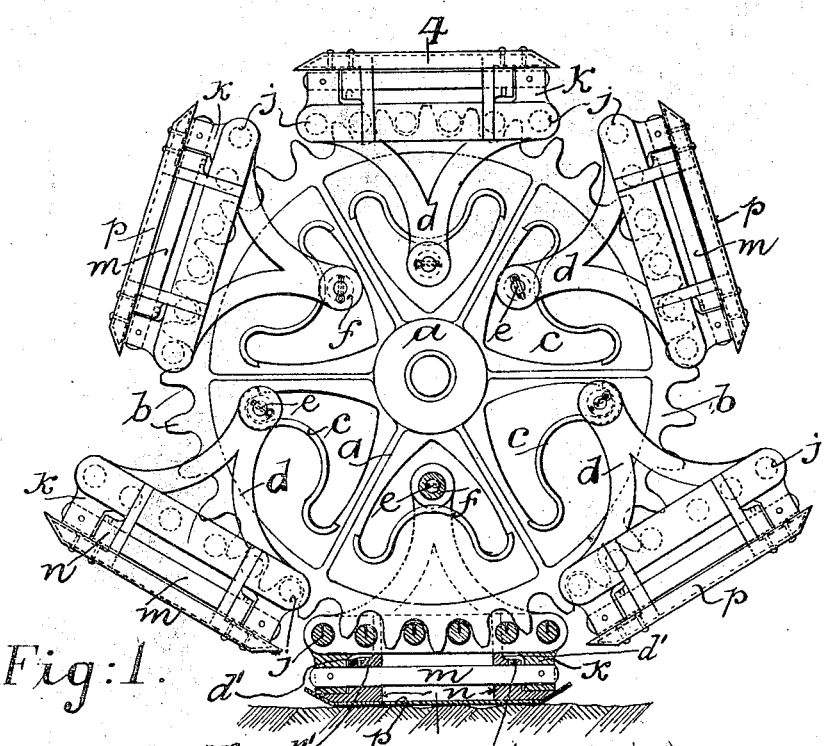

Nov. 4, 1924.  
C. R. HANSON  
MULTIPEDAL TRACTOR WHEEL  
Filed Nov. 16, 1922  
1,514,518

Inventor:
Charles Rasmas Hanson
By
Attorney

Patented Nov. 4, 1924.

1,514,518

UNITED STATES PATENT OFFICE.

CHARLES RASMAS HANSON, OF JARNAD-UP, WESTERN AUSTRALIA, AUSTRALIA.

MULTIPEDAL TRACTOR WHEEL.

Application filed November 16, 1922. Serial No. 601,340.

*To all whom it may concern:*

Be it known that I, CHARLES RASMAS HANSON, a native born citizen of the Republic of the United States of America, residing at Jarnad-Up, Western Australia, Commonwealth of Australia, have invented certain new and useful Improvements in Multipedal Tractor Wheels, of which the following is a specification.

This invention relates to that type of wheeled vehicle or tractor in which a tread or track is automatically and continuously laid down and lifted up by the rotation of the wheels when progressive movement of the said vehicle ensues. My invention has been devised to provide improved means for easy transportation and traction over soft-sandy or like yielding surfaces of heavily laden and slow moving vehicles, tractors and the like. By means of this invention a maximum of tractive power and capacity with a minimum of friction and wear of the working members is obtained.

The present invention has also been devised to materially reduce the number of cooperating parts in the type of wheeled vehicle or tractor having track means in connection with the wheels thereof, and also to render the construction generally of a stronger and more durable character and wherein the parts are easily assembled and effectively operate. The invention consists in the construction and arrangement of the several parts which will be more fully hereinafter described and claimed.

In the drawing:

Fig. 1 is a side elevation of a wheel constructed in accordance with this invention, the lowermost shoe being shown in section and acting as a tread or track.

Figures 2, 3:
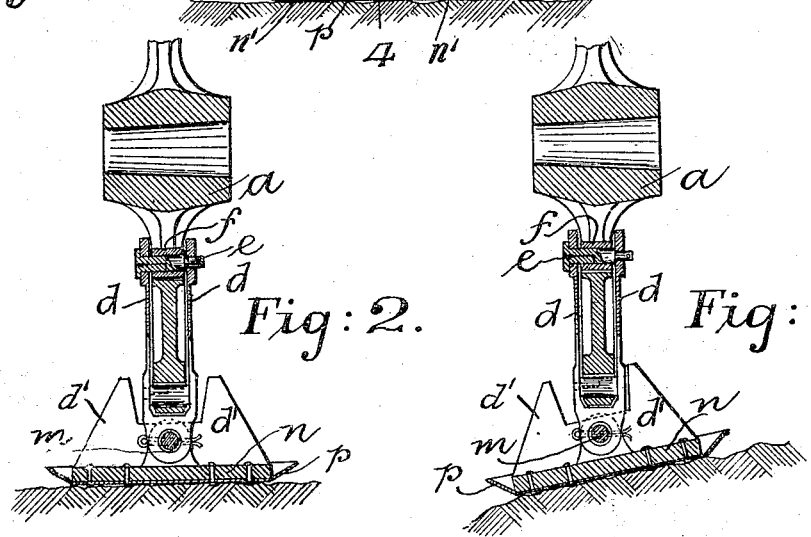

Fig. 2 is a fragmentary sectional view on line 4—4 of Fig. 1 and showing the shoe on a level surface while Fig. 3 is a similar view showing the shoe in a tilted position and bearing on a slanting surface. Referring to the drawings in detail, $a$ designates a wheel formed with radially projecting peripheral teeth $b$. The body of said wheel is provided with a plurality of openings with arcuate walls forming tracks or runways $c$ preferably of the shape and form shown in Fig. 1. A double cheeked frame $d$ is associated with each of said runways by means of a pin extending through the cheeks thereof and carrying a rotatable antifriction sleeve $f$ which moves over said track or runway. The lower portion of each frame is provided with a series of transverse bars $j$ which form a rack with which the teeth $b$ of the wheel $a$ are adapted to intermesh. It is obvious that said bars $j$ may be cast integrally or otherwise secured to the frame $d$. The frames $d$ also have end lugs $k$ wherein is secured a longitudinal hinge bar $m$ which also passes through shouldered hinge lugs $n'$ rising from a shoe plate or base $n$ provided with a tread or track plate $p$ having upwardly and outwardly flared end and side flanges. By means of said bar $m$ the shoe member $n$ is permitted to have a lateral swinging movement and whereby the shoes which provide the tread or track for the wheels automatically accommodate themselves to any irregularities of the road surface and adapt the wheels of the vehicle to easily pass over inclined or otherwise uneven surfaces. By reference to the drawings it will be plainly seen that each separate shoe member $n$ is enabled to fall and take up its proper working position on the road and act as a tread or track and also to gradually rise and resume its idle position on the wheel after the wheel has passed thereover, and the rotatable sleeve $f$ of the frame $d$ with which such shoe member is associated will be free to move over its track or runway $c$ to change the position of such shoe, the movement of each shoe being controlled by engagement of the teeth $b$ of the wheel $a$ with the bars $j$ of such shoe. Each shoe member by the mounting and engagement thereof as hereinbefore explained will automatically move into working position by gravity during rotation and progress of the wheel in either a forward or rearward direction.

The lugs $n'$ have their upper portions reduced and projected vertically with relation to the opposite sides of the frames $d$, as at $d'$, to provide guards which may, in the event of excessive lateral inclination, engage the opposite sides of the lower portions of the said frame and thereby limit the lateral movement of the shoes, this operation being effected without requiring any particular adjustment or manipulation. Furthermore, the single hinge or pivot rod $m$ is an advantageous construction in that each frame and shoe may be readily associated and also strengthened and rendered more durable to withstand wear, especially in view of the fact that the said single hinge or pivot bar is of comparatively large diameter. The track plate $p$ is securely fastened to the shoe plate or base $n$ and presents a substantially flat under bearing surface, which with the upwardly and outwardly flaring sides and ends insures a positive and unobstructed engagement of the shoe with the roadway or ground surface and a more ready clearance when the shoe by operation of the same rises after it has served its purpose.

What I claim as my invention and desire to secure by Letters Patent is—

1. A wheel having radially projecting peripheral teeth and a plurality of openings with arcuate walls forming tracks in the body thereof, a plurality of frames operatively associated with the tracks, the lower portion of each frame being provided with a series of transverse bars which form a rack for engagement with the teeth of the wheel, each frame also having end lugs, a shoe movably applied to the lower portion of each frame and having a base plate with hinge lugs rising therefrom and provided with opposite vertical guards to cooperate with the adjacent side portions of the frame, the shoe also having a lower track plate rigidly secured thereto, and a single hinge bar extending longitudinally through the lugs of the frame and base plate of the shoe to permit lateral movement of the latter to conform to inclinations and other irregularities in the ground surface.

2. A wheel having radially projecting peripheral teeth and a plurality of openings with arcuate walls forming tracks in the body thereof, a plurality of frames operatively associated with the tracks, the lower portion of each frame being provided with a series of transverse bars which form a rack for engagement with the teeth of the wheel, each frame also having end lugs, a shoe movably applied to the lower portion of each frame and having a lower track plate secured thereto and provided with side and end upwardly and outwardly flaring flanges, and a single hinge bar extending longitudinally through the lugs of the frame and portions of the shoe to permit the latter to have automatic lateral movement in opposite directions to conform to inclinations and irregularities of the ground surface.

In testimony whereof I have hereunto set my hand in presence of two subscribing witnesses.

CHARLES RASMAS HANSON.

Witnesses:
RICHARD SPARROW,
FRED H. LAMBERT.